United States Patent
Kekre et al.

(10) Patent No.: US 6,996,687 B1
(45) Date of Patent: Feb. 7, 2006

(54) METHOD OF OPTIMIZING THE SPACE AND IMPROVING THE WRITE PERFORMANCE OF VOLUMES WITH MULTIPLE VIRTUAL COPIES

(75) Inventors: Anand A. Kekre, Pune (IN); John A. Colgrove, Los Altos, CA (US); Oleg Kiselev, Palo Alto, CA (US)

(73) Assignee: Veritas Operating Corporation, Mountain View, CA (US)

( * ) Notice: Subject to any disclaimer, the term of this patent is extended or adjusted under 35 U.S.C. 154(b) by 274 days.

(21) Appl. No.: 10/324,812

(22) Filed: Dec. 20, 2002

(51) Int. Cl.
*G06F 12/00* (2006.01)

(52) U.S. Cl. .................. 711/162; 711/161; 707/204
(58) Field of Classification Search ......... 711/161–162, 711/156; 714/1–7; 707/204
See application file for complete search history.

(56) References Cited

U.S. PATENT DOCUMENTS

| | | | | |
|---|---|---|---|---|
| 5,155,824 A | | 10/1992 | Edenfield et al. | 711/143 |
| 5,241,670 A | * | 8/1993 | Eastridge et al. | 714/1 |
| 5,241,672 A | * | 8/1993 | Slomcenski et al. | 707/202 |

(Continued)

FOREIGN PATENT DOCUMENTS

| | | |
|---|---|---|
| EP | 0 332 210 A2 | 9/1989 |
| EP | 0 566 966 A2 | 10/1993 |
| EP | 1 091 283 A2 | 4/2001 |

OTHER PUBLICATIONS

Anand A. Kekre, et al., pending U.S. App. No. entitled "Method and Apparatus for Creating a Virtual Data Copy," Ser. No. 10/769,317; filed Jan. 30, 2004, including Specification: pp. 1–27; Drawings: Figures 1–14 on 11 sheets.

Anand A. Kekre, et al., pending U.S. App. No. entitled "Method And Apparatus For Restoring A Corrupted Data Volume," Ser. No. 10/254753; filed Sep. 25, 2002, including Specification: pp. 1–26; Drawings: Figures 1–10 on 7 sheets.

(Continued)

*Primary Examiner*—Nasser Moazzami
(74) *Attorney, Agent, or Firm*—Campbell Stephenson Ascolese LLP

(57) ABSTRACT

Disclosed is a method and apparatus for optimizing memory space and improving the write performance in a data processing system having a data volume with multiple virtual copies thereof. In one embodiment of the method, a first virtual copy of a primary data volume is created. Thereafter, first data of the primary data volume is modified. A second virtual copy of the primary data volume is created after modification of the first data thereof. A write-data transaction for modifying second data of the modified primary data volume is generated after creation of the second virtual copy. The second data of the modified primary data volume is copied to memory allocated to store data of the second virtual copy. The second data of the modified primary data volume is modified after the second data is copied to the memory allocated to store data of the second virtual copy.

14 Claims, 5 Drawing Sheets

U.S. PATENT DOCUMENTS

| | | | |
|---|---|---|---|
| 5,497,483 | A | 3/1996 | Beardsley et al. .............. 714/1 |
| 5,506,580 | A | 4/1996 | Whiting et al. ............... 341/51 |
| 5,532,694 | A | 7/1996 | Mayers et al. ................ 341/67 |
| 5,574,874 | A | 11/1996 | Jones et al. ................. 712/200 |
| 5,649,152 | A | 7/1997 | Ohran et al. ................ 711/114 |
| 5,778,395 | A | 7/1998 | Whiting et al. ............ 707/204 |
| 5,835,953 | A | 11/1998 | Ohran ........................ 711/162 |
| 5,907,672 | A | 5/1999 | Matze et al. .................... 714/8 |
| 6,061,770 | A | 5/2000 | Franklin ..................... 711/162 |
| 6,073,222 | A | 6/2000 | Ohran ........................ 711/162 |
| 6,085,298 | A | 7/2000 | Ohran ........................ 711/162 |
| 6,141,734 | A | 10/2000 | Razdan et al. ............. 711/144 |
| 6,189,079 | B1 | 2/2001 | Micka et al. ............... 711/162 |
| 6,282,610 | B1 | 8/2001 | Bergsten ..................... 711/114 |
| 6,341,341 | B1 | 1/2002 | Grummon et al. .......... 711/162 |
| 6,353,878 | B1 | 3/2002 | Dunham ..................... 711/162 |
| 6,366,987 | B1 * | 4/2002 | Tzelnic et al. .............. 711/162 |
| 6,434,681 | B1 | 8/2002 | Armangau .................. 711/162 |
| 6,460,054 | B1 | 10/2002 | Grummon .................. 707/204 |
| 6,564,301 | B1 | 5/2003 | Middleton .................. 711/144 |
| 6,591,351 | B1 | 7/2003 | Urabe et al. ................. 711/162 |
| 6,643,667 | B1 * | 11/2003 | Arai et al. ................... 707/200 |
| 6,771,843 | B1 * | 8/2004 | Huber et al. ................. 382/305 |
| 6,785,789 | B1 | 8/2004 | Kekre et al. ................. 711/162 |
| 6,792,518 | B2 * | 9/2004 | Armangau et al. ......... 711/162 |
| 2003/0041220 | A1 | 2/2003 | Peleska ...................... 711/162 |

OTHER PUBLICATIONS

Anand A. Kekre, et al., pending U.S. App. No. entitled "Incremental Backup of a Data Volume," Ser. No. 10/264,934; filed Oct. 4, 2002, including Specification: pp. 1–21; Drawings: Figures 1–8 on 5 sheets.

Oleg Kiselev, et al., pending U.S. App. No. entitled "Instant Refresh of a Data Volume Copy," Ser. No. 10/326,427; filed Dec. 19, 2002, including Specification: pp. 1–25; Drawings: Figures 1–11 on 6 sheets; now U.S. Patent No. 6,880,053; Issue Date: Apr. 12, 2005.

Oleg Kiselev, et al., pending U.S. App. No. entitled "Instant Refresh of a Data Volume Copy," Ser. No. 11/068,546; filed Feb. 28, 2005, including Specification: pp. 1–25; Drawings: Figures 1–11 on 6 sheets.

* cited by examiner

US 6,996,687 B1

METHOD OF OPTIMIZING THE SPACE AND IMPROVING THE WRITE PERFORMANCE OF VOLUMES WITH MULTIPLE VIRTUAL COPIES

BACKGROUND OF THE INVENTION

Many businesses rely on large-scale data processing systems for storing and processing business data. FIG. 1 illustrates (in block diagram form) relevant components of a data processing system 10. Data processing system 10 and the description thereof should not be considered prior art to the invention described or claimed herein.

Data processing system 10 includes a host node 12 coupled to data storage system 14 and data storage systems 16(1)–16(y). The term "coupled" should not be limited to what is shown within FIG. 1. Two devices (e.g., host node 12 and data storage system 14) may be coupled together directly or indirectly via a third device. Although data storage systems 14 and 16(1) appear to be coupled in series with host node 12, the present invention should not be limited thereto. Data storage systems 14 and 16(1) could be coupled together in parallel with host node 12 in an alternative embodiment. Storage systems 16(1)–16(y) may also be coupled in parallel with host node 12 in an alternative embodiment.

For purposes of explanation, data storage system includes memory 20 while data storage systems 16(1)–16(y) include memories 22(1)–22(y), respectively. Memories 20 and 22(1)–22(y) need not be contained in separate data storage systems. In an alternative embodiment, several of the memories 20 and 22(1)–22(y) may be part of a single memory unit contained within one data storage system.

Each of the data memories 20 and 22(1)–22(y) may take form in one or more dynamic or static random access memories, one or more arrays of magnetic or optical data storage disks, or combinations thereof. Data memories 20 and 22(1)–11(y) should not be limited to the foregoing hardware components; rather, these memories may take form in any hardware, software, or combination of hardware and software in which data may be persistently stored and accessed. Data memories 20 and 22(1)–22(y) may take form in a complex construction of several hardware components operating under the direction of software. The data memories may take form in mirrored hardware. It is further noted that the present invention may find use with many types of redundancy/reliability systems. For example, the present invention may be used with a redundant array of independent disks (RAID) systems. Moreover, the present invention should not be limited to use in connection with the host node of a data storage network. The present invention may find use in a storage switch or in any of many distinct appliances that can be used with a data storage system.

Data memory 20 stores data of a primary data volume. The primary data volume is the working volume of data processing system 10. Data memories 22(1)–22(y) store data or are configurable to store data of separate data volumes. For purposes of explanation, data memories 22(1)–22(y) will be described as storing data of data volume(1)–data volume(y), respectively. Each of data volume(1)–data volume(y) may be a point in time (PIT) copy of the primary data volume or a modified PIT (MPIT) copy of the primary data volume. A PIT copy, as its name implies, is a copy of the primary data volume created at some point in time. An MPIT copy is a PIT copy which contains data that was modified after creation of the PIT copy. Each of data volume(1)–data volume(y), whether PIT or MPIT, can be used to restore the primary data volume in the event of a data corruption thereof.

As will be more fully described below, each of data volume(1)–data volume(y) can be virtual or real. For example, data volume(1) is virtual when some data of data volume(1) is found stored within memory 20 rather than memory 22(1). Data volume(1) is real when all data of data volume(1) is stored in memory 22 (1). A virtual data volume can be converted to a real data volume via a background data copying process performed by host node 12. In the background copying process, for example, data of the virtual data volume(1) is copied from memory 20 to memory 22(1) until all data of data volume(1) is stored in memory 22(1).

FIG. 2 represents (in block diagram form) a logical structure of data memories 20 and 22(1)–22(y). Each memory is shown having $n_{max}$ memory blocks into which data can be stored. Each memory block shown in FIG. 2 represents one to an arbitrarily large number of regions in physical memory that store data. The physical memory regions of a block need not be contiguous to each other. However, the physical memory regions are viewed as logically contiguous by a data management system executing on host node 12. Any or all of memories 20 and 22(1)–22(y) may have more than $n_{max}$ memory blocks.

For purposes of explanation, each block of data memory 20 stores data of the primary data volume. For purposes of explanation, the $n_{max}$ memory blocks of memories 22(1)–22(y) can be allocated by host node 12 for storing data of data volumes(1)–(y), respectively. Corresponding memory blocks in data memories 20 and 22(1)–22(y) can be equal in size. Thus, memory block 1 of data memory 20 can be equal in size to memory block 1 of data memories 22(1)–22(y). Each of the memory blocks within data memory 20 may be equal in size to each other. Alternatively, the memory blocks in data memory 20 may vary in size.

Host node 12 may take form in a computer system (e.g., a server computer system) that processes requests from client computer systems (not shown). Host node 12 generates read or write data transactions that access memory 20 in response to receiving requests from client computer systems. Host node 12 is capable of accessing memories 22(1)–22(y) via read or write data transactions.

Host node 12 includes a data storage management system (not shown) that takes form in software instructions executing on one or more processors (not shown) within host node 12. The data management system includes a file system and a system for managing the distribution of data of a volume across several memory devices. Volume Manager provided by VERITAS Software Corporation of Mountain View, Calif., is an exemplary system for managing the distribution of volume data across memory devices. Volume and disk management products from other product software companies also provide a system for managing the distribution of volume data across memory devices. Hardware RAID adapter cards and RAID firmware built into computer systems likewise provide this function.

As noted above, each of data volumes(1)–(y) can be a virtual PIT or virtual MPIT copy of the primary data volume. Host node 12 creates data volumes(1)–(y) in succession beginning with data volume(1). Each of the data volumes (1)–(y) is initially created as a virtual PIT copy of the primary data volume as it exists at the time each of the data volumes(1)–(y) is respectively created. Host node 12 can create a virtual data volume according to the methods described in copending U.S. patent application Ser. No.

10/143,059 entitled "Method and Apparatus for Creating a Virtual Data Copy," which is incorporated herein by reference in its entirety.

When host node 12 creates virtual data volumes(1)–(y), host node 12 creates valid/modified (VM) maps such as VM map 30 and VM maps 32(1)–32(y) represented in FIG. 3. VM map 30 and VM maps 32(1)–32(y) may be persistently stored in memory of host node 12 or elsewhere. VM map 30 corresponds to memory 20 while VM maps 32(1)–32(y) correspond to memories 22(y)–22(y), respectively.

VM maps 30 and 32(1)–32(y) include $n_{max}$ entries of two bits each in the embodiment shown in FIG. 3. Each entry of VM map 30 corresponds to a respective block of memory 20, while each entry of VM maps 32(1)–32(y) corresponds to a respective block of data memories 22(1)–22(y), respectively. The first and second bits in each entry are designated $V_n$ and $M_n$, respectively. $V_n$ in each entry, depending upon its state, indicates whether its corresponding memory block n contains valid data. For example, when set to logical 1, $V_2$ of VM map 30 indicates that block 2 of memory 20 contains valid primary volume data, and when set to logical 0, $V_2$ of VM map 30 indicates that block 2 of memory 20 contains no valid primary volume data. It is noted that when $V_n$ is set to logical 0, its corresponding memory block n may contain data, but this data is not considered valid. $V_2$ Of VM map 32(1), when set to logical 1, indicates that block 2 of memory 22(1) contains valid data of data volume(1). $V_2$ of VM map 32(1), when set to logical 0, indicates that block 2 of memory 22(1) does not contain valid data.

$M_n$ in each entry, depending on its state, indicates whether data within its corresponding memory block n has been modified. For example, when set to logical 1, $M_3$ of VM map 30 indicates that block 3 of memory 20 contains data that was modified via a write data transaction since creation of a data volume. When set to logical 0, $M_3$ via map 30 indicates that block 3 of memory 20 contains unmodified data. Likewise, $M_3$ in VM map 32(1), when set to logical 1, indicates that block 3 in memory 22(1) contains data that was modified via a write data transaction since creation of data volume(1). When set to logical 0, $M_3$ of VM map 32(1) indicates that block 3 of memory 22(1) contains no modified data.

When VM map 30 is first created, $V_n$ in each entry is initially set to logical 1 thus indicating that each block n in memory 20 contains valid data of the primary volume. When each of the VM maps 32(1)–32(y) is first created, $V_n$ and $M_n$ of each entry is set to logical 0 thus indicating that the corresponding memory block n contains no valid or modified data. Host node can change the state of one or more bits in each map entry using single or separate I/O operations at the memory address that stores the map entry.

As noted above, host node 12 may run a background copying process to transform a virtual data volume into a real data volume. In this background copying process, host node 12 copies data of memory 20 to, for example, memory 22(1) in a block by block or blocks by blocks fashion until virtual data volume(1) is transformed into a real data volume (1). However, before the background copying process is started or completed, host node 12 can modify data of the primary data volume.

FIG. 4 illustrates relevant operational aspects of modifying data of the primary data volume via a write data transaction after creation of virtual data volumes(1)–(y). The process illustrated in FIG. 4 implements a copy-on-write procedure which is initiated in response to a client computer request to modify data of the primary data volume. More particularly, in step 40, host node 12 generates a write data transaction for modifying data in block n of primary memory 20. This write data transaction can be generated in response to the request from the client computer system to modify data of the primary data volume. For purposes of explanation, the phrase "modifying data" includes writing new data to an otherwise empty memory region. In response to generating the write data transaction, host node 12 sets variable x to 0 in step 42. Thereafter, in step 44, host node 12 increments x by 1. Thereafter, in step 46, host node accesses VM map 32(x) to determine the state of $V_n$ therein. If $V_n$ is set to logical 0, block n of memory 22(x) does not contain a valid copy of block n of memory 20. Accordingly, the process proceeds to step 50 where host node 12 copies the data contents of block n of primary memory 20 to block n of memory 22(x). In step 52, host node sets $V_n$ of VM map 32(x) to logical 1.

As noted above, host node 12 must copy the contents of block n of primary memory 20 to block n in each of the memories 22(1)–22(y) if these memories do not already have a valid copy of the data in block n of memory 20. The counter x is used to check whether all of the memories 22(1)–22(y) contain a valid copy of the data of block n in memory 20. Accordingly, in step 54, host node compares the current value of x to y. If x does not equal y, then host node 12 increments x by 1 in step 44 and $V_n$ of the next VM map 32(x) is checked to see if block n of memory 22(x) contains a valid copy of the data in block n of memory 20. Eventually, after all memories 22(1)–22(y) are checked to determine whether block n thereof contain a valid copy of block n of memory 20, x will be incremented to equal y and the process will proceed to step 56 where host node 12 sets $M_n$ of VM map 30 to logical 1. Lastly, in accordance with the write data transaction generated in step 40, host node 12 modifies data in block n of primary memory 20.

FIG. 4 shows the VM maps 30 and 32(1)–32(y) of FIG. 3 after modification of block 3 in memory 20 using the process described in FIG. 4. As can be seen in FIG. 5, $V_3$ in VM maps 32(1)–32(y) is set to logical 1 thus indicating that memory block 3 in memories 22(1)–22(y) contain a valid copy of data in block 3 of memory 20. Before modifying block 3 in memory 20 in accordance with step 60 of the process shown in FIG. 4, step 50 must be repeated y times to copy data from block n of memory 20 to block n of memories 22(1)–22(y). If y, the total number of virtual data volumes is large enough, a substantial delay may be created between the time host node 12 receives a request to modify data in the primary volume and the time data in block n in memory 20 is modified in step 20.

SUMMARY OF THE INVENTION

Disclosed is a method and apparatus for optimizing memory space and improving the write performance in a data processing system having a data volume with multiple virtual copies thereof. In one embodiment of the method, a first virtual copy of a primary data volume is created. Thereafter, first data of the primary data volume is modified. A second virtual copy of the primary data volume is created after modification of the first data thereof. A write-data transaction for modifying second data of the modified primary data volume is generated after creation of the second virtual copy. The second data of the modified primary data volume is copied to memory allocated to store data of the second virtual copy. The second data of the modified primary data volume is modified after the second data is copied to the memory allocated to store data of the second virtual copy.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention relates to a method and apparatus for improving the efficiency of modifying data of a volume. In one embodiment, the method is implemented as software instructions executing on one or more processors. The software instructions may be stored within a memory medium transferable to a computer system having the one or more microprocessors.

Figure 1:
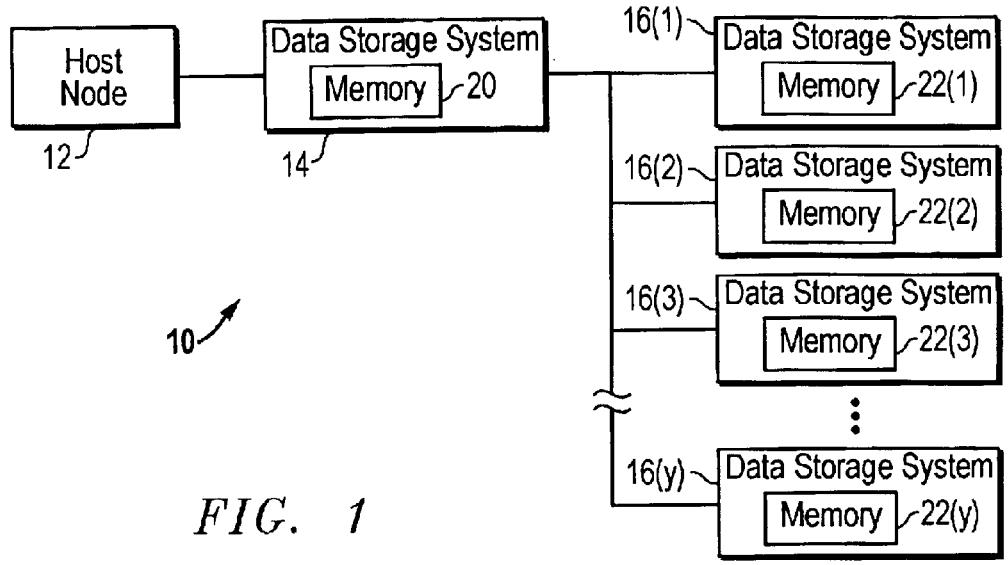
FIG. 1 is a block diagram of a data processing system.
Figure 2:
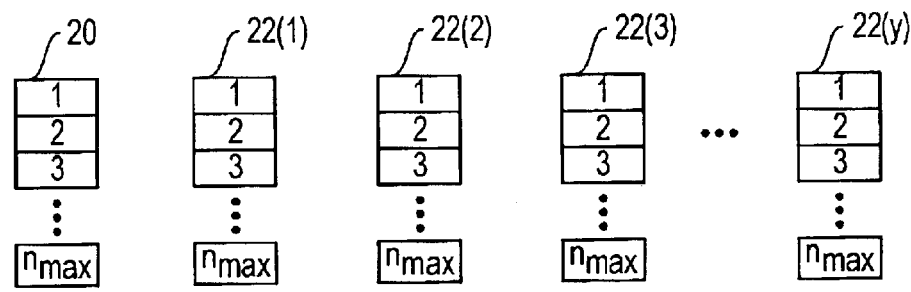
FIG. 2 shows block diagrams illustrating memory structure of storage systems shown in FIG. 2.
Figure 6:
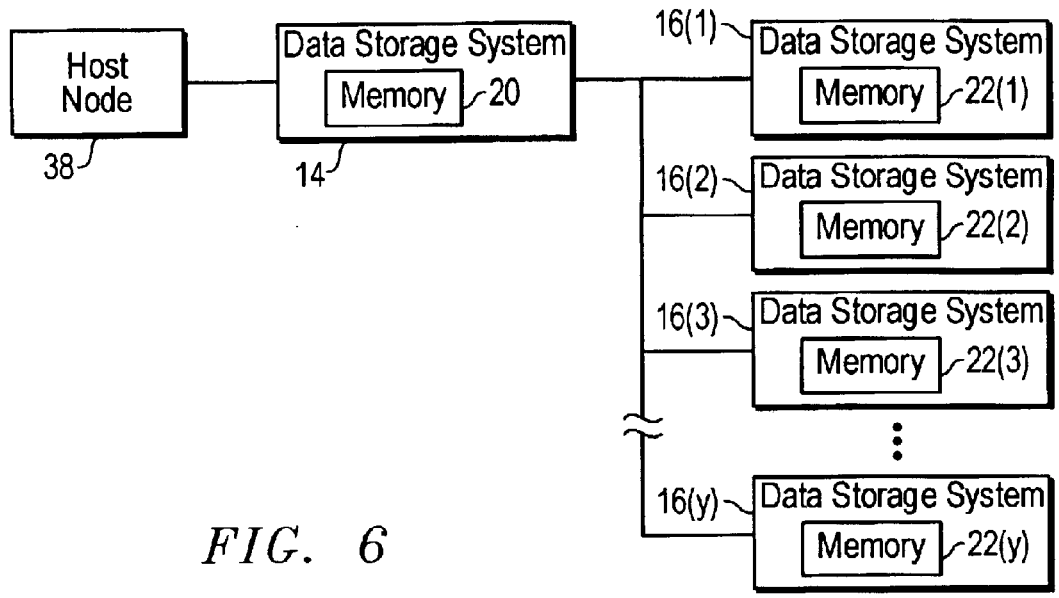
FIG. 6 is a block diagram of a data processing system employing one embodiment of the present invention.
Figures 8, 9:
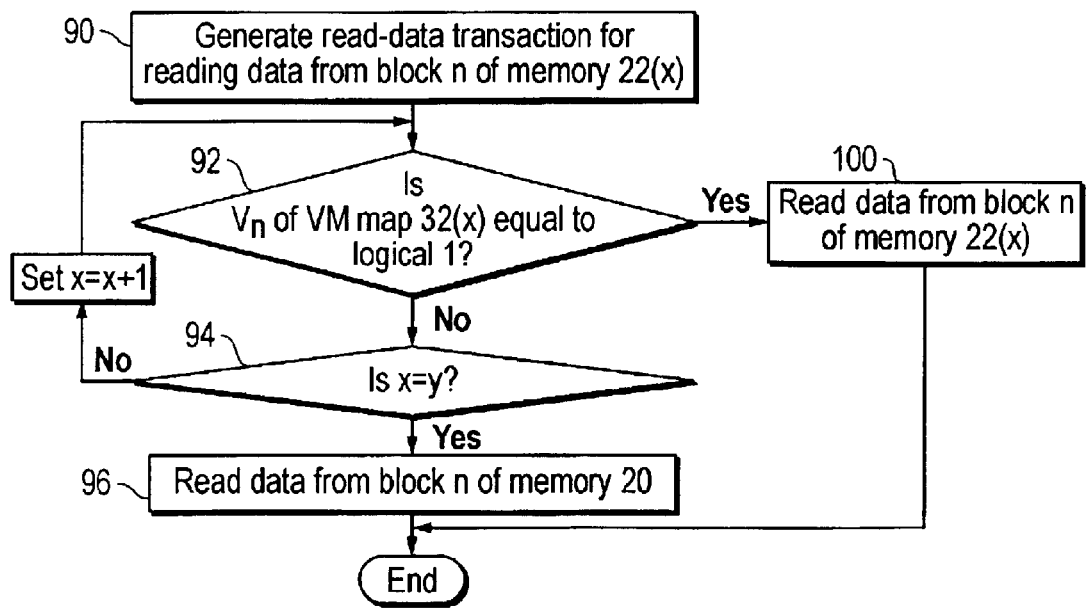
FIG. 8 shows the VM maps of FIG. 3 after performing a write-data transaction according to the process illustrated in FIG. 7.
FIG. 9 is a flow chart illustrating operational aspects of the host node shown in FIG. 6 performing a read-data transaction in accordance with one embodiment of the present invention.

FIG. 6 illustrates a data processing system employing one embodiment of the present invention. The data processing system of FIG. 8 is the same as the data processing system 10 of FIG. 1 except host node 12 is replaced by host node 38. Host node 38, like host node 12, is capable of successively creating multiple virtual data volumes(1)–(y) which are PIT copies or MPIT copies of the primary data volume stored within memory 20. However, host node 38, as will be more fully described below, operates in a manner different compared to host node 12 when host node 12 receives a request to write data to the primary data volume from a client computer system (not shown) coupled thereto.

Figure 7:
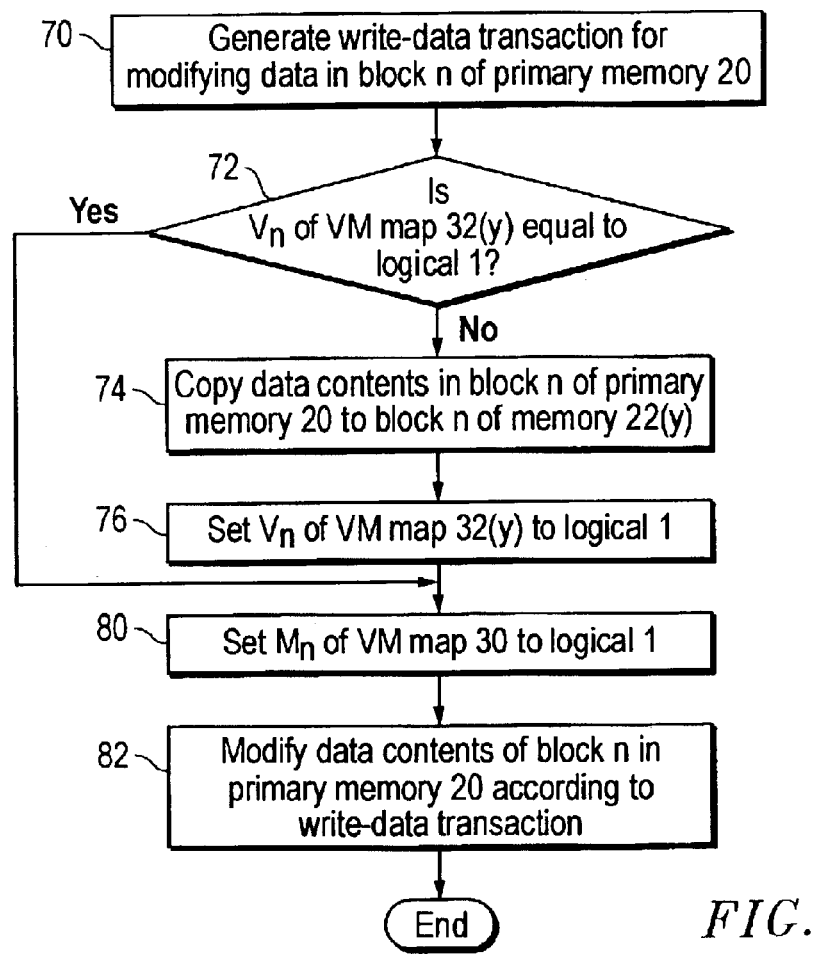
FIG. 7 is a flow chart illustrating operational aspects of the host node shown in FIG. 6 performing a write-data transaction for modifying data of the primary data volume in accordance with one embodiment of the present invention.

FIG. 7 illustrates operational aspects of host node 38 responding to a client computer request to modify data in the primary data volume according to one embodiment of the present invention. More particularly, host node 38 generates a write data transaction for modifying data in block n of primary memory 20 in step 70 in response to host node 38 receiving the request. After generating the write data transaction, host node 38 checks the status of $V_n$ of VM map 32(y) corresponding to the most recently created virtual data volume(y) in step 72. If $V_n$ is equal to logical 0, then memory 22(y) does not have a copy of the data contents in block n of memory 20. Accordingly, in step 74, host node 38 copies the data contents of block n in memory 20 to block n of memory 22(y). Thereafter, in step 76 host node 38 sets $V_n$ of VM map 32(y) to logical 1. After step 76 or in response to determining that $V_n$ of VM map 32(y) is equal to logical 1 in step 72, host node 38 sets $M_n$ of VM map 30 to logical 1. Lastly, in step 82, host node 38 modifies the data contents of block n in primary memory 20 according to the write data transaction generated in step 70.

Figure 3:
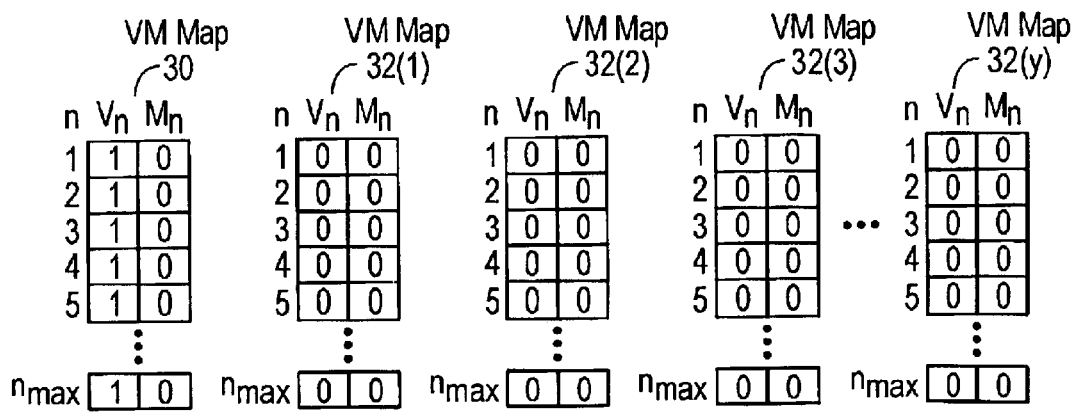
FIG. 3 is a block diagram of VM maps created by the host node shown in FIG. 1.
Figure 4:
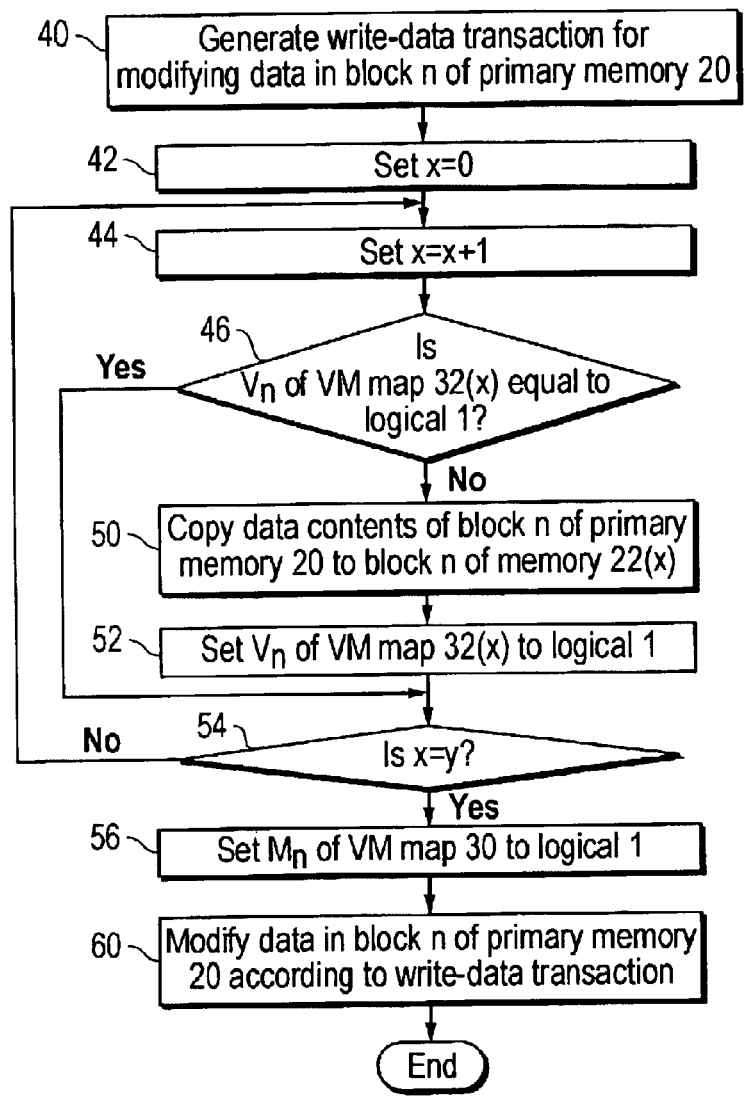
FIG. 4 is a flow chart illustrating operational aspects of the host node shown in FIG. 1 performing a write-data transaction for modifying data of the primary data volume.
Figure 5:
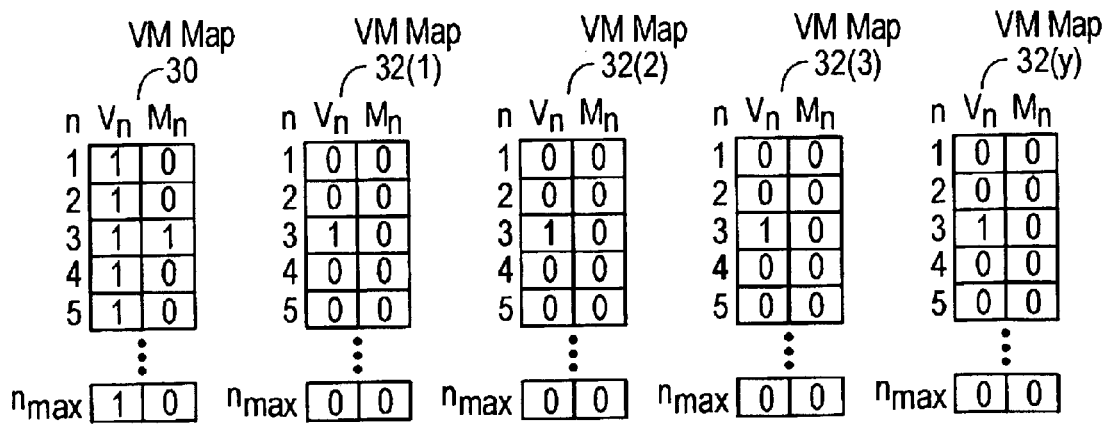
FIG. 5 shows the VM maps of FIG. 3 after performing a write-data transaction according to the process illustrated in FIG. 4.

In the process described in FIG. 6, host node 38 copies data of block n of memory 20 only to block n of memory 22(y). In contrast, the process described in FIG. 4 may require host node 12 to copy data of block n of primary memory 22 to block n in each of the memories 22(1)–22(y). Because the process described in FIG. 6 requires only one copy process, host node 38 can respond to a request to write data to the primary data volume more quickly than host node 12 of FIG. 1. Moreover, because data of data block n is copied only to block n of the memory 22(y) in the process of FIG. 7, the process is more efficient. Also, the total amount of memory needed to implement primary data volume modification can be smaller when using the process in FIG. 6 when compared to the process shown in FIG. 4 if cache structured or space optimized storage is used. It should be noted that a cache structured or space optimized storage is not necessary for this invention to work. Other space saving storage organization techniques may also be applied. FIG. 8 illustrates the VM maps 30 and 32(1)–32(y) shown in FIG. 3 after performing a write data transaction to memory block 3 of memory 20 in accordance with the process shown in FIG. 6. In contrast to FIG. 5, only $V_n$ of VM map 32(y) is set to logical 1.

Host node 38 is capable of reading data from any of the virtual data volumes(1)–(y). FIG. 8 illustrates operational aspects of one embodiment employed by host node 38 for reading data from one of the virtual data volumes. More particularly, in step 90, host node 38 generates a read data transaction for reading data from block n of memory 22(x) where x is any number from 1–y. When host node 38 generates the read data transaction, host node 38 accesses VM map 32(x) in step 92 to determine the state of $V_n$ therein. If $V_n$ is set to logical 0, then the data sought to be read by host node 38 is not contained within block n of memory 22(x). Presuming $V_n$ is set to logical 0 in step 92 host node 38 determines whether x is equal to y in step 94. If x does not equal y, host node 38 increments x by 1 and the process repeats with step 92 where host node 38 again checks the value of $V_n$ in the next VM map 32(x). At some point, $V_n$ will equal logical in step 92 or x will compare equally to y in step 94. If $V_n$ in VM map 32(x) equates to logical 1 in step 92, then data is read from block n of memory 22(x) and returned to host node 38 as the data sought, and the process ends. If x equates equally to y in step 94, then data is read from block n of memory 20 and returned as the data sought, and the process ends.

Figure 10:
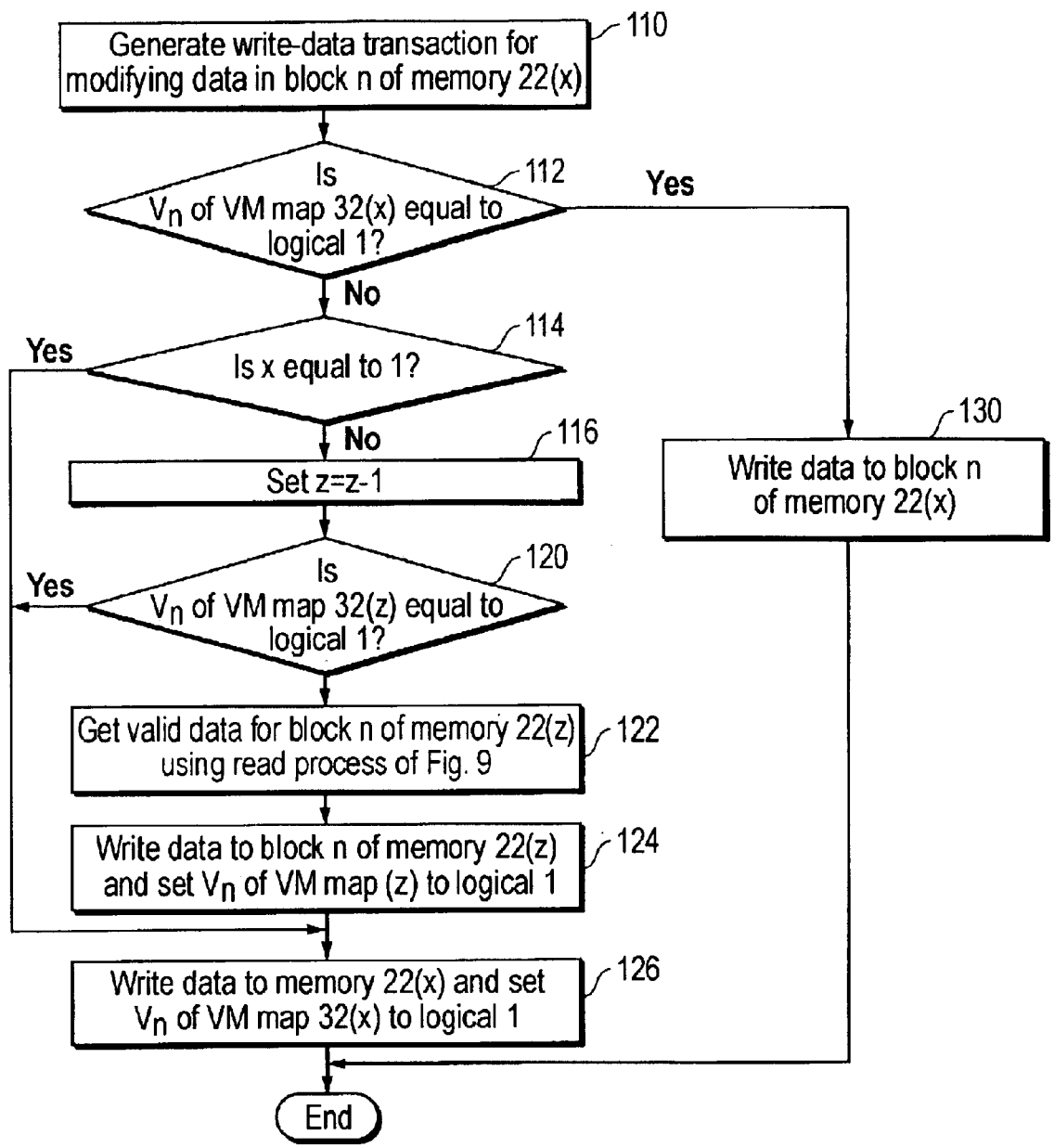
FIG. 10 is a flow chart illustrating operational aspects of the host node shown in FIG. 6 performing a write-data transaction in accordance with one embodiment of the present invention.

As noted above, host node 38 is capable of modifying data of any of the virtual data volumes (1)–(y). FIG. 10 illustrates operational aspects of host node 38 modifying data in one of virtual data volumes (1)–(y). More particularly, in step 110, host node 38 generates a write data transaction for modifying data in block n of memory 22(x) where x is a number from 1 to y. In response to step 10, host node 38 accesses VM map 32(x) to determine the state of $V_n$ therein. If $V_n$ in VM map 32(x) is equal to logical 1, host node 38 in step 130 writes data to block n of memory 22(x) according to the write-data transaction and the process ends. If $V_n$ in VM map 32(x) is equal to logical 0 in step 112, the process proceeds to step 114 where host node 38 compares x to 1. If x does not equal 1, host node 38 sets variable z to x−1 in step 116. In step 120, host node 38 checks the value of $V_n$ of VM map 32(z). If $V_n$ equals logical 0 in step 120, data to be modified must be retrieved from block n of memory 22(z) using the read process of FIG. 9 as shown in step 122. Thereafter, in step 124, host node 38 writes the data read in step 122 to memory 22(x) and sets $V_n$ of VM map (z) to logical 1. After step 124 or in response to a determination that x equals 1 in step 114, host node 38 writes data to block n of memory 22(x) and sets $V_n$ of VM map (x) to logical 1 in step 126 and the process ends.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A computer readable medium comprising instructions executable by a computer system, wherein the computer system implements a method in response to executing the instructions, the method comprising:

creating a primary data volume;

creating a first virtual copy of the primary data volume;

modifying first data of the primary data volume after creation of the first virtual copy thereof;

creating a second virtual copy of the primary data volume after modification of the first data thereof;

generating a write-data transaction for modifying second data of the primary data volume, wherein the write-data transaction is generated after creation of the second virtual copy;

copying the second data of the primary data volume to memory allocated to store data of the second virtual copy;

modifying the second data of the primary data volume after the second data is copied to the memory allocated to store data of the second virtual copy;

copying a third virtual copy of the primary data volume after modification of the second data thereof;

wherein, before the second data of the primary volume is modified, the second data is copied only to the memory allocated to store data of the second virtual copy.

2. The computer readable medium of claim 1 wherein the method further comprises:

after the second data of the primary volume is modified, copying the second data stored in memory allocated to stroe data of the second virtual copy to memory allocated to store data of the first virtual copy.

3. The computer readable medium of claim 1 wherein the method further comprises:

generating a read-data transaction for reading data from one of the first, second, or third virtual copies; accessing memoryy allocated to store data of the primary data volume in response to generating the read-data transaction; reading data from the accessed memory.

4. The computer readable medium of claim 1 wherein the method further comprises:

generating a read-data transaction for reading data from one of the first, second, or third virtual copies; accessing memory allocated to store data of the second virtual copy in response to generating the read-data transaction; reading data from the accessed memory.

5. The computer readable medium of claim 1 wherein the method further comprises:

generating a read-data transaction for reading data from one of the first, second, or third virtual copies; accessing memory allocated to store data of the third virtual copy in response to generating the read-data transaction; reading data from the accessed memory.

6. The computer readable medium of claim 1 wherein the method further comprises:

generating a write-data transaction for modifying data of the first or second virtual coies;

copying data stored in the memory allocated to store data of the third virtual copy to memory allocated to store data of the first or second virtual copies; modifying the data copied to memory allocated to store data of the first or second virtual copies.

7. An apparatus comprising:

a primary memory for storing a primary data volume;

first, second, and third secondary memories;

means for creating a first virtual copy of the primary data volume;

means for modifying first data of the primary data volume after creation of the first virtual copy thereof;

means for creating a second virtual copy of the primary data volume after modification of the first data thereof;

means for generating a write-data transaction for modifying second data of the modified primary data volume, wherein the write-data transaction is generated after creation of the second virtual copy;

means for generating a third virtual copy of the primary data volume after modification of the second data thereof;

means for allocating the first, second, and third secondary memories to store data of the first, second, and third virtual copies, respectively;

means for copying the second data of the modified primary data volume to the second secondary memory;

means for modifying the second data of the modified primary data volume after the second data is copied to the second secondary memory; wherein, before the second data of the primary data volume is modified, the second data is copied only to the second memory.

8. The apparatus of claim 7 further comprising means for copying the second data stored in the second secondary memory to the first secondary memory after the second data of the primary volume is modified.

9. A method comprising:

creating a primary data volume;

creating a first virtual copy of the primary data volume;

modifying first data of the primary data volume after creation of the first virtual copy thereof;

creating a second virtual copy of the primary data volume after modification of the first data thereof;

generating a write-data transaction for modifying second data of the primary data volume, wherein the write-data transaction is generated after creation of the second virtual copy; copying the second data of the primary data volume to memory allocated to store data of the second virtual copy;

modifying the second data of the primary data volume after the second data is copied to the memory allocated to store data of the second virtual copy; creating a third virtual copy of the primary data volume after modification of the second data thereof;

wherein, before the second data of the primary volume is modified, the second data is copied only to the memory allocated to store data of the second virtual copy.

10. The method of claim 9 further comprising:

after the second data of the primary volume is modified, copying the second data stored in memory allocated to store data of the second virtual copy to memory allocated to store data of the first virtual copy.

11. The method of claim 9 further comprising:

generating a read-data transaction for reading data from one of the first, second, or third virtual copies;

accessing memory allocated to store data of the primary data volume in response to generating the read-data transaction;

reading data from the accessed memory.

12. The method of claim 9 further comprising:

generating a read-data transaction for reading data from one of the first, second, or third virtual copies;

accessing memory allocated to store data of the second virtual copy in response to generating the read-data transaction;

reading data from the accessed memory.

13. The method of claim 9 further comprising:

generating a read-data transaction for reading data from one of the first, second, or third virtual copies;

accessing memory allocated to store data of the third virtual copy in response to generating the read-data transaction;

reading data from the accessed memory.

14. The method of claim 9 wherein the method further comprises:

generating a write-data transaction for modifying data of the first or second virtual coies;

copying data stored in the memory allocated to store data of the third virtual copy to memory allocated to store data of the first or second virtual copies;

modifying the data copied to memory allocated to store data of the first or second virtual copies.

* * * * *